United States Patent Office 3,461,135
Patented Aug. 12, 1969

3,461,135
PHTHALIMIDO-SUBSTITUTED PERFLUORO-
AROMATIC COMPOUNDS
Rex B. Gosnell, San Diego, Calif., assignor to Whittaker
Corporation, Los Angeles, Calif., a corporation of
California
No Drawing. Filed June 29, 1966, Ser. No. 561,395
Int. Cl. C07f 1/00; C07d 27/70
U.S. Cl. 260—326    2 Claims

ABSTRACT OF THE DISCLOSURE

This patent describes novel compounds having the formula

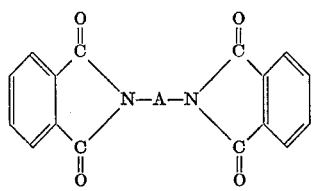

by reacting compounds of the formula

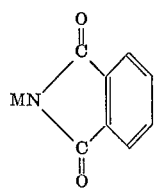

with compounds of the formula

Cl—A—Cl wherein A is a para divalent perfluoroaromatic group and M is an alkali metal. These compounds may be converted to para diamines of the formula $H_2N—A—NH_2$ by reaction with hydrazine. These diamines are intermediates in the preparation of perfluorinated aromatic diisocyanates. The perfluorinated aromatic diisocyanates are directly useful as fungicides and are also reactive with active hydrogen compounds to yield polymers of unusual thermal stability and oxidizer resistance.

---

The invention described herein was made in the performance of work under a NASA contract and is subject to the provisions of section 305 of the National Aeronautics and Space Act of 1958, Public Law 85–568 (72 Stat. 435; 42 U.S.C. 2457).

This invention relates to a novel method of preparing perfluorinated aromatic diamines.

In the literature, Journal of the Chemical Society, 1961, page 802, there is reported the synthesis of tetrafluoro-p-phenylene diamine in an overall yield of about 8%. This synthesis route involves the reaction of hexafluorobenzene with ammonia to incorporate one amine group in the aromatic ring. This amine group is then oxidized to a nitro group. The pentafluoronitrobenzene thus obtained is then reacted with another mole of ammonia and the resulting tetrafluoronitro-aniline is reduced to the tetrafluoro-p-phenylene diamine. This synthesis technique may be also utilized to prepare the meta isomer although the yields are even poorer. The present invention is concerned with a new route to the perfluorinated aromatic diamines in improved yields.

The principal object of the present invention is to provide a novel method for the preparation of perfluorinated aromatic diamines.

Another object of the present invention is to provide a new method of synthesizing perfluorinated aromatic diamines in improved yields.

More specifically, it is an object of my invention to provide perfluorinated aromatic diamines by the reaction of phthalimides with hydrazine.

These and other objects of the invention will become apparent from the detailed description which follows.

One of the novel synthesis techniques of the present invention involves the following series of reactions:

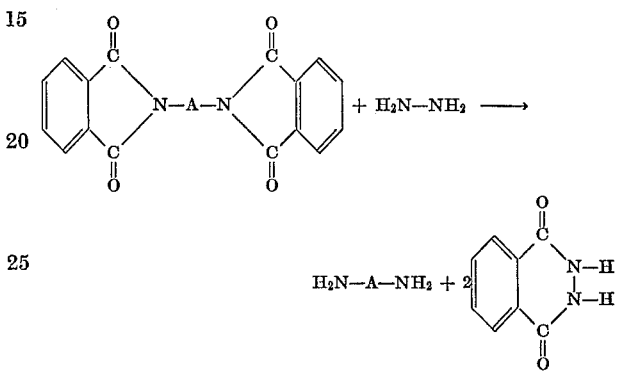

wherein in the above equation, A is a para divalent perfluoroaromatic group. Preferably A is a para tetrafluorophenylene group. However, A may also be para perfluorinated naphthylene, biphenylene, and the like.

The diphthalimide reactants are prepared in either of the two ways as follows:

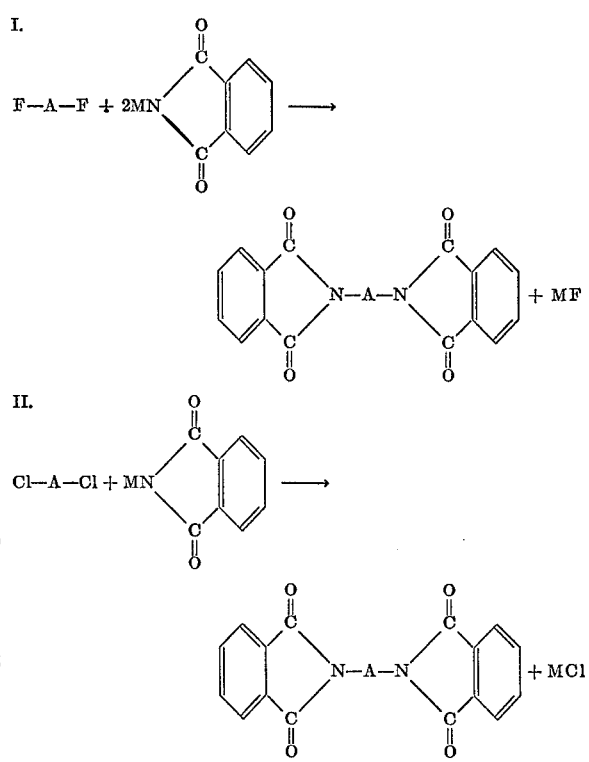

In Equations I and II, A is as defined above and M is an alkali metal such as sodium, lithium, or potassium.

The chlorine-containing reactant in Equation II is prepared as follows (illustrated for the case where A is perfluorophenylene):

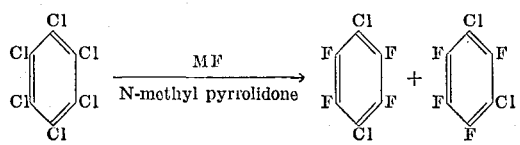

The reaction II provides a means of synthesizing the perfluoro aromatic diamines from the relatively inexpensive perchlorinated aromatic materials (hexachlorobenzene=$0.40/lb.) rather than from perfluorinated aromatic compounds (hexafluorobenzene=$119.00/lb.), and hence is the preferred method of obtaining the diphthalimide reactants for use in my invention.

The foregoing reaction superficially appears to resemble the classical Gabriel synthesis. However, heretofore the Gabriel synthesis has not proved successful in the conversion of aromatic halides to aromatic amines. Quite surprisingly, according to the present invention it has been found that the Gabriel synthesis will successfully convert the aromatic halides to aromatic amines. While not bound by any theory it is believed that this is due to the electron withdrawing effect of the fluorine substituents which apparently renders two of the halogens subject to nucleophilic attack.

The reaction of the diphthalimide with hydrazine may be carried out in the presence or absence of a solvent. In this connection, it has been found that dimethyl formamide has a beneficial effect on the yield of the diamine. Normally the reaction occurs at a satisfactory reaction rate at a temperature of from about 20° to about 150° C. The perfluorinated aromatic diamines generated by the process of this invention may be isolated and purified by conventional techniques, usually by filtration, washing and crystallization. The proportions of reactants are not critical in this reaction, but optimum results are obtained utilizing three moles of hydrazine per mole of diphthalimide.

The following examples are presented solely to illustrate the invention and should not be regarded as limiting in any way. In the examples the parts and percentages are by weight unless otherwise indicated.

EXAMPLE 1

Into a 500 ml. flask equipped with a stirrer and a reflux condenser were placed 18.6 g. (0.1 mole) of hexafluorobenzene, 55.6 (0.3 mole) of potassium phthalimide, and 300 ml. of N-methylpyrrolidone. The reaction was heated to 135° C. and stirred for 8 hours and then poured into 1200 ml. of water. The tan solid was filtered, washed with water, and dried in an air oven at 100° C. The dry solid weighed 44 g. Recrystallization from pyridine gave 20 g. of a tan-colored material melting at 365°–375° C. with sublimation beginning at 315° C. Recrystallizing of a portion of this material again from pyridine gave a white powder with only a slight change in melting point (370° C.–375° C.).

The diphthalimide structure was indicated by the determination of $\epsilon_{max.}$ at 315 m$\mu$ which was observed to be twice that found for N-phenyl-phthalimide. The infrared spectrum supported the identity. Elemental analysis was consistent with the diimide structure.

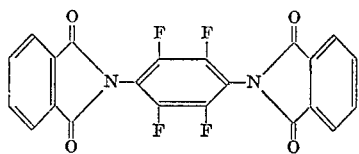

M.P. 370°–375° C.

*Elemental analysis.*—Calculated, percent C, 60.00; H, 1.80; F, 17.20; N, 6.40. Found, percent C, 60.64; H, 1.79; F, 16.27; N, 6.37.

Preparation of tetrafluoro-p-phenylene diamine

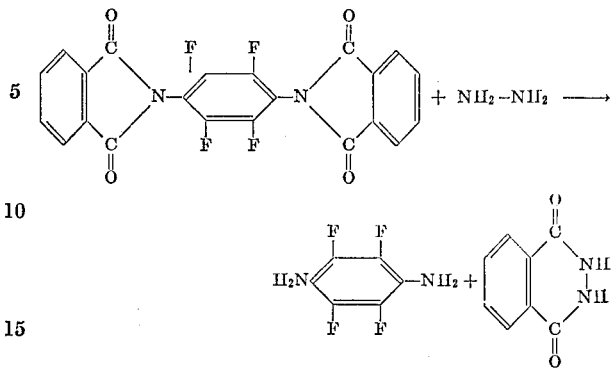

Recrystallized 1,4 - diphthalimidotetrafluorobenzene, 12.00 g. (0.027 mole), was placed in a 250 ml. 3-necked flask equipped with a stirrer, thermometer, and condenser. Hydazine hydrate, 4.05 g. (0.081 mole) and 75 ml. of ethanol were then added. The slurry was stirred for 75 minutes at 60°–70° C., then 15 ml. of concentrated HCl was added. The mixture was stirred for an additional 30 minutes at 60°–70° C., and 15 ml. of water was then added. The slurry was filtered to remove the phthalhydrazide.

The alcohol in the amine hydrochloride solution was removed by evaporation and the solution filtered to remove the last traces of phthalhydrazide. The solution was cooled to 10°–15° C., then made alkaline with sodium hydroxide while maintaining the temperature at 10° to 15° C. The crude diamine was recrystallized to yield 50% (from hexafluorobenzene) of almost colorless flat needles of tetrafluoro-p-phenylene diamine, M.P. 143.5–145° C. Sublimation occurs readily at 120° C. to form colorless needles with no change in melting point. The infrared spectrum supports the identity as tetrafluoro-p-phenylene diamine.

*Elemental Aanalysis.*—Calculated, percent C, 39.90; H, 2.20; N, 15.50; F, 42.10. Found, percent C, 20.30; H, 2.44; N, 15.23; F, 42.40. The literature gives a melting point of 144°–145° C. for this compound.

EXAMPLE 2

Recrystallized 1,4 - diphthalimidotetrafluorobenzene, 12.00 g. (0.027 mole) was placed in a 250 ml., 3-necked flask equipped with a stirrer, thermometer and condenser. Hydrazine hydrate, 4.05 g. (0.081 mole) and 75 ml. of ethanol were then added. The slurry was stirred for an additional 30 minutes at 60–70° C. Most of the ethanol was removed by distillation and then 15 ml. of water was added to the slurry. The mixture was cooled to 10–15° C. and made alkaline with aqueous sodium hydroxide maintaining the temperature at 10–15° C. The slurry was then placed in a steam distillation apparatus, and the tetrafluoro-p-phenylene diamine recovered as along white crystals by distillation.

The meta perfluorinated aromatic diamines of this invention are prepared as follows:

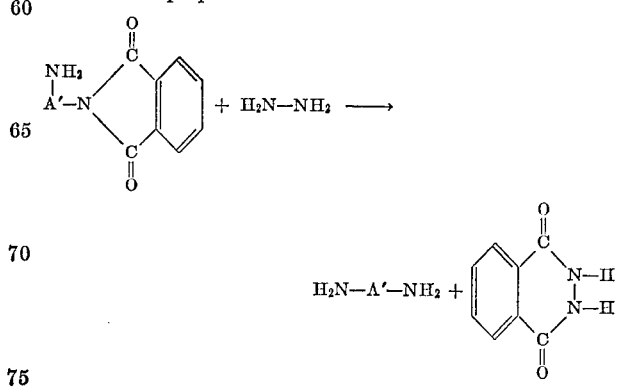

wherein A' is a para divalent perfluoroaromatic group. Preferably, A is a meta tetrafluorophenylene group.

The phthalimide reactant in this case is prepared as follows:

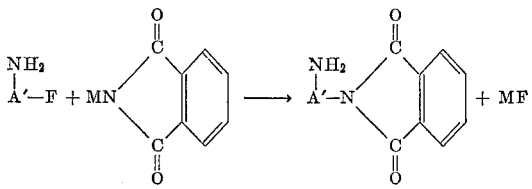

wherein M is as previously defined.

The reaction of the phthalimide with the hydrazine may optionally be carried out in the presence of a solvent and a small amount of a mineral acid such as hydrochloric acid. The reaction conditions are otherwise essentially the same as for the preparation of the para isomers.

EXAMPLE 3

A 500 ml., three-necked, round-bottom flask fitted with a reflux condenser, thermometer and mag-bar stirrer was charged with pentafluoroaniline (9.15 g., 0.05 mole), potassium phthalimide (9.25 g., 0.05 mole) and redistilled dimethylformamide (100 ml.). The reaction mixture was heated in an oil bath, over a hot plate, to 135° C. and held at temperature for 1½ hours. The temperature was reduced to 60° C. and the solvent stripped off under reduced pressure. Ethyl alcohol (5 ml.) plus anhydrous hydrazine (4 ml.) were added to the almost dry residue. The mixture was refluxed (78°–80° C.) for 1½ hours. Concentrated HCl (20 ml.) was added to the warm solution and reflux continued an additional ½ hour. The precipitate of phthalhydrazide was filtered off, washed with 80 ml. ethyl alcohol, and the combined filtrates concentrated to 40 ml. under reduced pressure.

The solution was made slightly basic (pH 8–9) with NaOH solution, and steam distilled. Aqueous distillate (200 ml.) was collected and extracted three times with 200 ml. portions of ether. The ether extracts were combined and the ether stripped off. The white crystalline residue was recrystallized from 60°–90° C. ligroin. Yield=1.2 g. (13.4%) tetrafluoro-m-phenylenediamine. M.P. 129°–130° C. (with sublimation); literature value 129.5°–131° C.[66]. The infrared spectrum was identical to that of the p-isomer.

The perfluorinated diamines of this invention are useful in the preparation of perfluorinated aromatic diisocyanates as more fully described in my copending U.S. patent application, Ser. No. 561,354 filed of even date herewith, the disclosure of which is expressly incorporated herein by reference.

As will be immediately apparent to those skilled in the art, the procedures of this invention are adaptable to the synthesis of the entire class of perfluorinated aromatic diamines including tetrafluoro-m-phenylene diamine, octafluoro-p-biphenylene diamine, hexafluoro-1,8-naphthylene diamine, and the like.

As illustrated by the foregoing, the procedures of this invention provide a new approach to the preparation of perfluorinated aromatic diamines whereby these compounds are obtained in a yield of 50% or more. This represents a major improvement in yield over prior procedures, and will permit a substantial reduction in the cost of these compounds. In addition, the process of my invention yields diamines in a very pure form, and hence elaborate purification procedures are obviated to a considerable extent.

I claim:
1. A compound of the formula

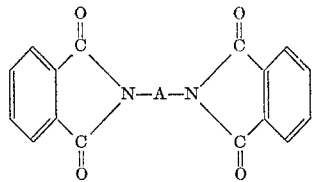

wherein A is a para divalent perfluoroaromatic group selected from the group consisting of perfluorophenylene, perfluoronaphthalene and perfluorobiphenylene.

2. The compound 1,4-diphthalimidotetrafluorobenzene.

References Cited
UNITED STATES PATENTS 3,036,088  5/1962  Harris _____ 260—326

ALEX MAZEL, Primary Examiner

J. A. NARCAVAGE, Assistant Examiner

U.S. Cl. X.R.

260—453, 578